(12) United States Patent
Hiraide

(10) Patent No.: US 9,726,894 B2
(45) Date of Patent: Aug. 8, 2017

(54) HEAD-MOUNTED DISPLAY

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/075,473

(22) Filed: Mar. 21, 2016

(65) Prior Publication Data

US 2016/0282627 A1    Sep. 29, 2016

(30) Foreign Application Priority Data

Mar. 25, 2015 (JP) ................................. 2015-062195

(51) Int. Cl.
*G02B 27/14*    (2006.01)
*G02B 27/01*    (2006.01)
*G02B 5/00*    (2006.01)
*F21V 8/00*    (2006.01)

(52) U.S. Cl.
CPC ......... *G02B 27/0176* (2013.01); *G02B 5/005* (2013.01); *G02B 6/0011* (2013.01); *G02B 27/0172* (2013.01); *G02B 2027/013* (2013.01); *G02B 2027/0159* (2013.01); *G02B 2027/0161* (2013.01); *G02B 2027/0163* (2013.01); *G02B 2027/0169* (2013.01); *G02B 2027/0178* (2013.01); *G02B 2027/0194* (2013.01)

(58) Field of Classification Search
USPC ................... 359/630–635; 345/7–9; 351/158
See application file for complete search history.

(56) References Cited

U.S. PATENT DOCUMENTS

| | | | | |
|---|---|---|---|---|
| 5,742,264 A | * | 4/1998 | Inagaki ............... | G02B 27/017 345/7 |
| 2002/0089469 A1 | * | 7/2002 | Cone .................. | G02B 27/0176 345/8 |
| 2009/0243964 A1 | * | 10/2009 | Rottenkolber ..... | G02B 27/0176 345/8 |
| 2010/0073262 A1 | * | 3/2010 | Matsumoto ........ | G02B 27/0176 345/8 |
| 2010/0245754 A1 | * | 9/2010 | Matsumoto ........ | G02B 27/0176 351/158 |

(Continued)

FOREIGN PATENT DOCUMENTS

| | | |
|---|---|---|
| JP | H06-70265 A | 3/1994 |
| JP | 2013-037095 A | 2/2013 |
| JP | 2013-073188 A | 4/2013 |

*Primary Examiner* — Mohammed Hasan
(74) *Attorney, Agent, or Firm* — Oliff PLC

(57) ABSTRACT

By rotating each optical member including an image display apparatus by a rotation unit, it is possible to change an aspect ratio and display an image. At this time, the rotation unit rotates a stop having an opening with a shape corresponding to the shape of an emission surface of image light in a video display element which is a video element of the image display apparatus along with the image display apparatus. Accordingly, even when an image with a horizontally long aspect ratio is shown and even when an image with a vertically long aspect ratio is shown, occurrence of stray light can be suppressed. Thus, guiding of the image light by a light-guiding optical system can be maintained in a good state, and thus good image display can be realized.

12 Claims, 15 Drawing Sheets

(56) References Cited

U.S. PATENT DOCUMENTS

| | | | |
|---|---|---|---|
| 2011/0012814 A1* | 1/2011 | Tanaka | G02B 27/0176 345/8 |
| 2012/0086625 A1 | 4/2012 | Takeda et al. | |
| 2015/0062716 A1* | 3/2015 | Komatsu | G02B 27/0172 359/630 |
| 2015/0219900 A1* | 8/2015 | Rhodes | G02B 27/0176 345/8 |
| 2015/0241707 A1* | 8/2015 | Schowengerdt | G06T 7/73 345/8 |

* cited by examiner

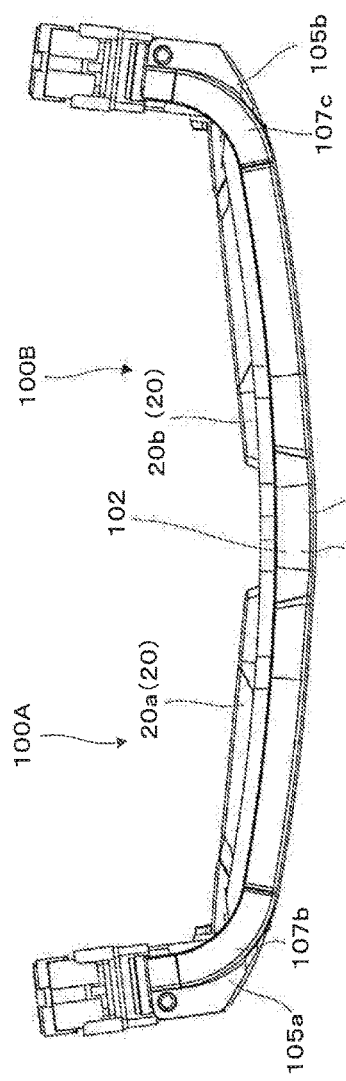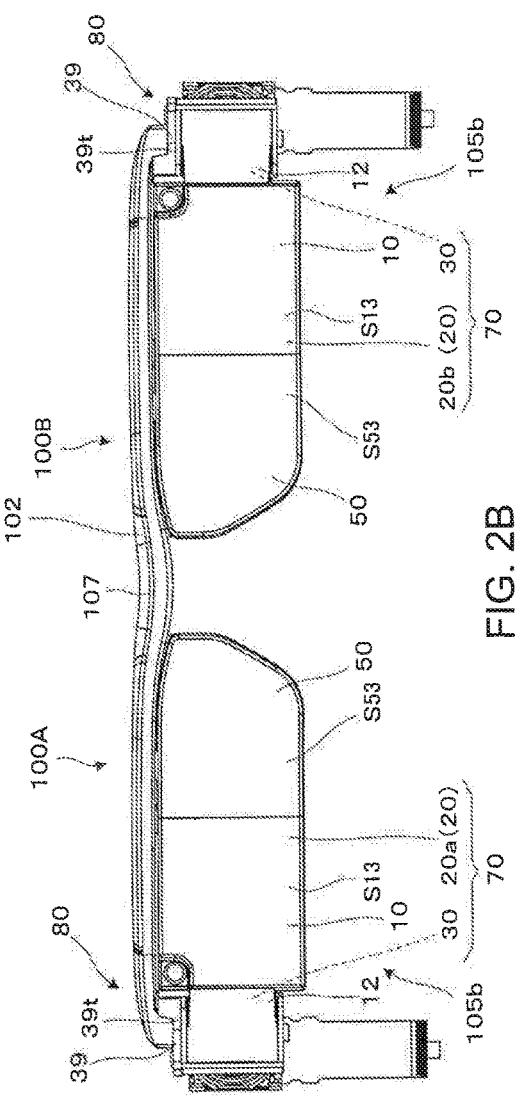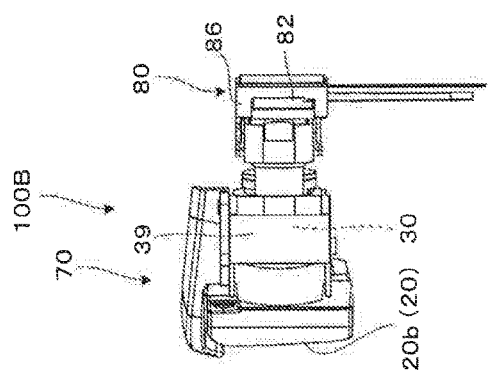

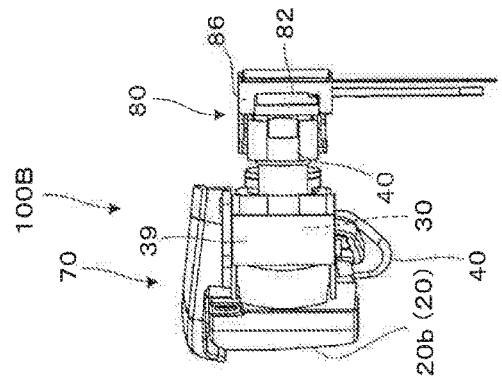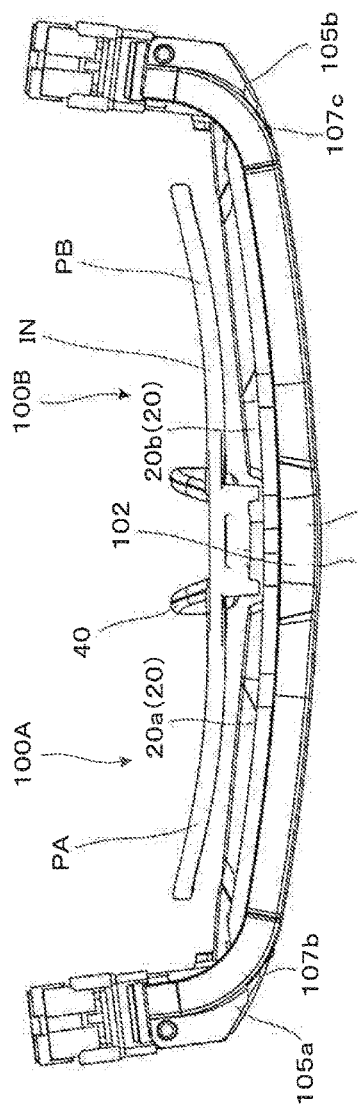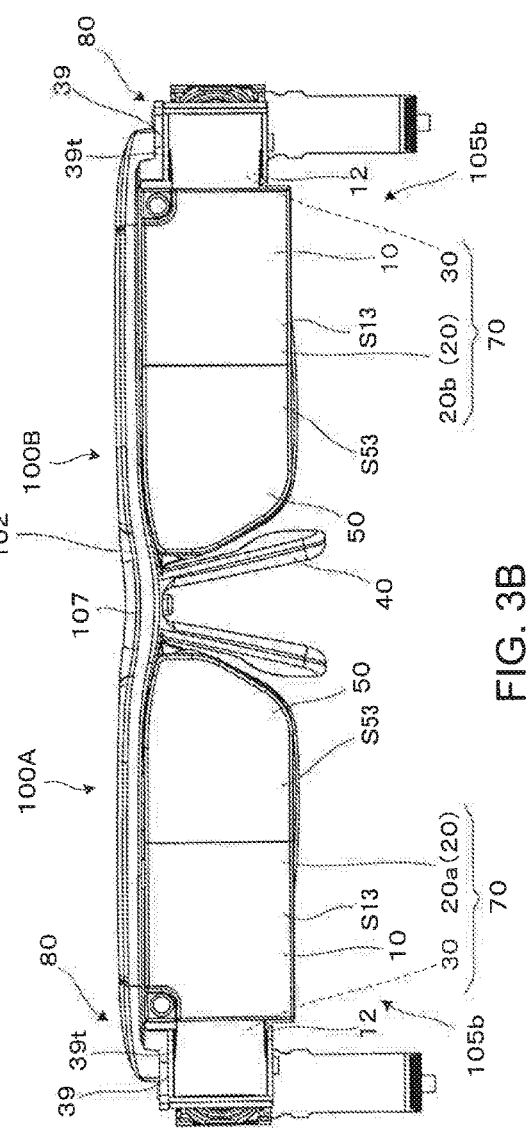

FIG. 6A
FIG. 6B
FIG. 6C
FIG. 6D
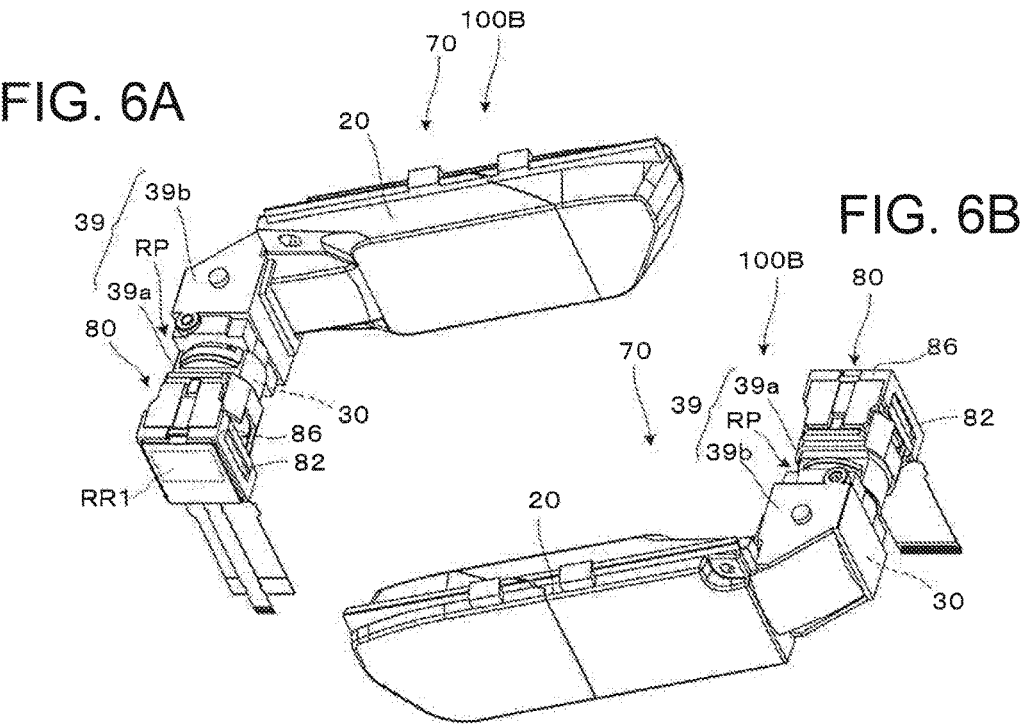
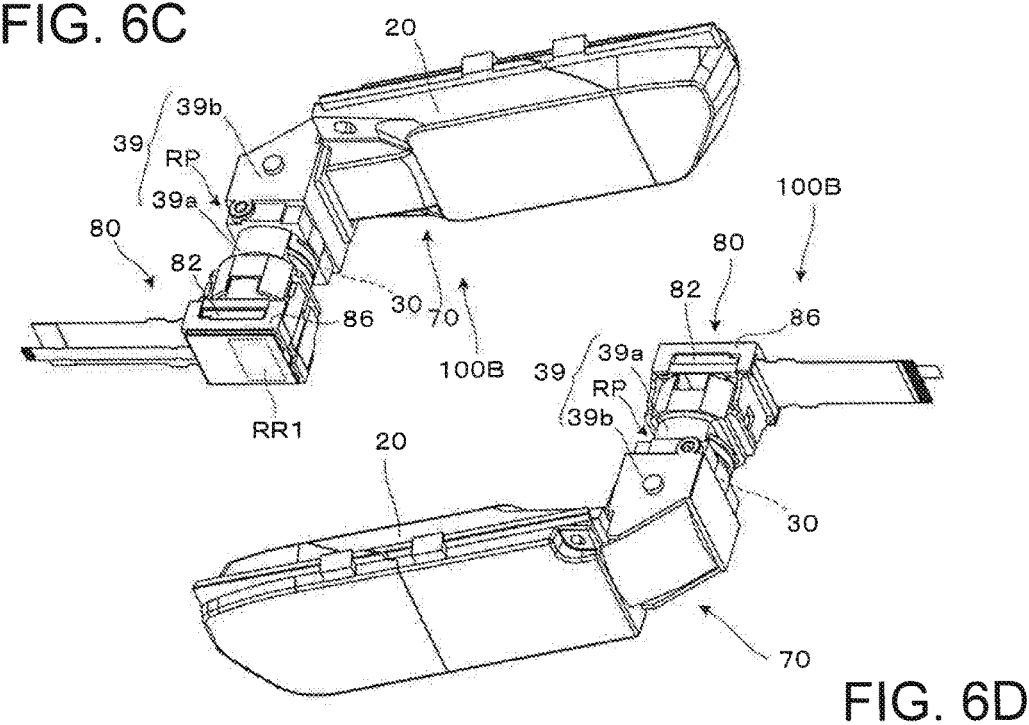

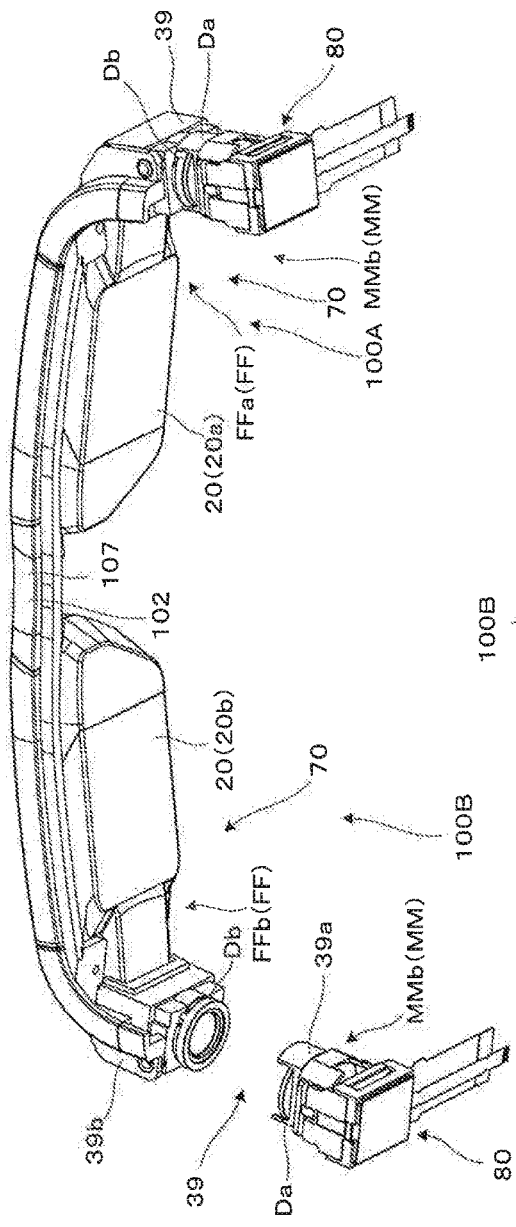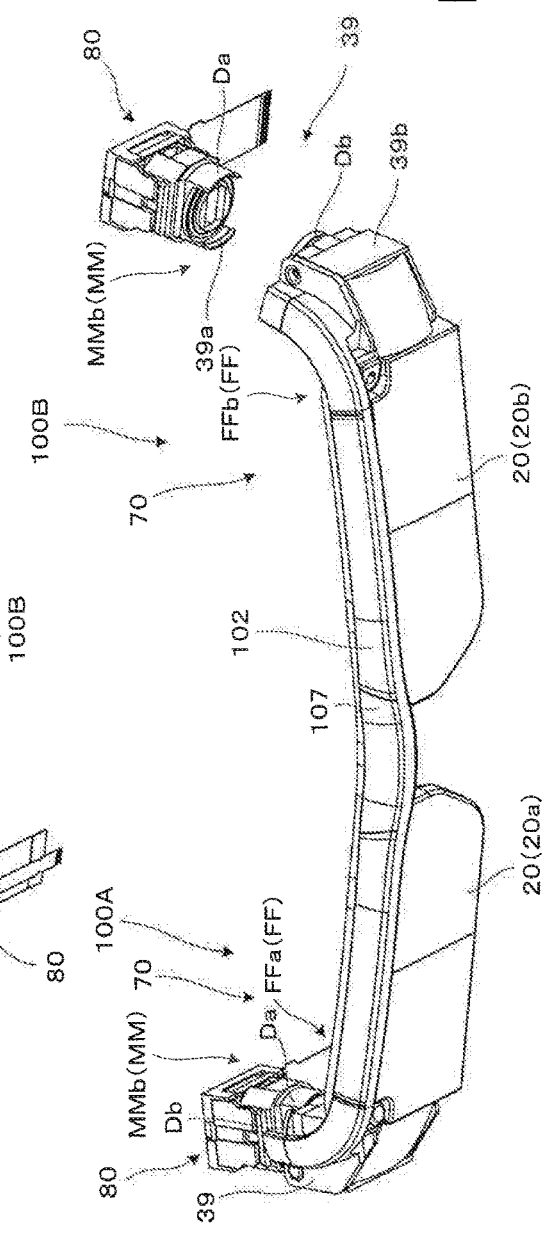

HEAD-MOUNTED DISPLAY

BACKGROUND

1. Technical Field

The present invention relates to a head-mounted display mounted on a head for use.

2. Related Art

In recent years, various types of displays in which image light from display elements is guided to pupils of eyes of observers by light-guiding plates have been proposed as head-mounted displays (hereinafter also referred to as HMDs) capable of forming virtual images and enabling the observers to observe the virtual images. When HMDs are used to watch movies, it is preferable to have horizontally long aspects. However, for example, HMDs are also used to correspond to images with vertically long aspects, such as images for smartphones. In this case, even when the vertically long aspects are used without conversion, the vertically long aspects can be partially displayed. However, resolutions deteriorate and screens also decrease.

There are known head-mounted displays referred to as HMDs that display images by providing rotation mechanisms in display elements or adjusting aspect ratios by toric optical systems to change the aspect ratios (see JP-A-2013-073188 and JP-A-2013-37095). There is also a known video display apparatus configured such that an image display element and an eyepiece optical system (half mirror) guiding an image of the image display element are integrated and are rotatable (see JP-A-6-70265).

However, these display apparatus may not be said to meet use needs for desiring to display both of an image with a horizontally long aspect ratio and an linage with a vertically long aspect ratio with high resolution and in a good state.

SUMMARY

An advantage of some aspects of the invention is to provide a head-mounted display capable of displaying an image by changing an aspect ratio and displaying an image in a good state.

A head-mounted display according to an aspect of the invention includes: a video element that generates image light; a light-guiding optical system that guides the image light from the video element; a stop that has an opening with a shape corresponding to a shape of an emission surface of the image light in the video element; and a rotation unit that rotates the stop along with the video element.

In the head-mounted display, an aspect ratio is changed to display an image by rotating the video element by the rotation unit. At this time, the rotation unit rotates the stop having the opening with the shape corresponding to the shape of the emission surface of the image light in the video element along with the video element. Therefore, even when an image with a horizontally long aspect ratio is shown and even when an image with a vertically long aspect ratio is shown, occurrence of stray light can be suppressed. Thus, the guiding of the image light by the light-guiding optical system can be maintained efficiently and in a good state, and thus good image display can be realized.

In a specific aspect of the invention, the video element forms an image of a rectangular region and is able to switch between vertical and horizontal postures in regard to a longitudinal direction and a transverse direction of the rectangular region with a rotation operation performed by the rotation unit. In this case, it is possible to switch the vertical and horizontal directions in regard to the longitudinal direction and the transverse direction and it is possible to switch between the vertically long display and the horizontally long display.

In another aspect of the invention, the light-guiding optical system has an effective region in which the image light is guided both vertically and horizontally in the vertical and horizontal switch by the rotation of the video element. In this case, it is possible to appropriately display an image for both of the vertically long display and the horizontally long display without deviation.

In still another aspect of the invention, the light-guiding optical system includes a symmetric curved surface and an asymmetric curved surface as optical surfaces passing the image light from the video element. The rotation unit may rotate an optical member having the asymmetric curved surface among optical members included in the light-guiding optical system. In this case, even when a part of the light-guiding optical system is rotated by the rotation of the rotation unit, an effect of refraction or reflection of the image light in the guiding of the light-guiding optical system is unchangeable.

In still another aspect of the invention, the light-guiding optical system includes a symmetric lens having the symmetric curved surface as an optical surface and an asymmetric lens having the asymmetric curved surface as an optical surface. The rotation unit may rotate the video element to the symmetric lens. In this case, it is possible to rotate the video element to the symmetric lens by the rotation of the rotation unit and perform the horizontal and vertical switch of the image display.

In still another aspect of the invention, the rotation unit performs a rotation operation around an optical axis of the light-guiding optical system.

In still another aspect of the invention, the head-mounted display further includes a column that fixes a plurality of optical members included in the light-guiding optical system. The column is connected to the video element and may be configured to include a first column member accommodating the optical member configured with only a symmetric curved surface in the light-guiding optical system and a second column member accommodating the optical member having an asymmetric curved surface in the light-guiding optical system. The rotation unit rotates the first column member in the column. In this case, it is possible to separate the rotated portion from the non-rotated portion in the rotation unit in accordance with the first and second column members included in the column, and perform the appropriate rotation operation.

In still another aspect of the invention, the stop is provided on a side of the first column member in a connection portion between the first and second column members and is rotated along with the first column member by the rotation unit. In this case, it is easy to provide a mechanism necessary to configure the rotation unit.

In still another aspect of the invention, the light-guiding optical system includes a light-guiding device including a light-guiding member that guides the image light by reflecting the image light from an internal surface and a light transmission member that is bonded to the light-guiding member so that outside light and the image light are viewed to overlap. The second column member positions the light-guiding device. In this case, it is possible to configure the see-through optical system superimposing the image light and the outside light.

In still another aspect of the invention, the rotation unit includes a stopper mechanism related to the rotation in a connection portion between the first and second column members. In this case, for example, the range (rotatable angle) of the rotation by the rotation unit can be decided in accordance with an uneven structure and a stopper serving as the stopper mechanism.

In still another aspect of the invention, a rotation range of the rotation unit is 90°. In this case, the rotation sufficient for the switch between the vertically long display and the horizontally long display can be performed.

In still another aspect of the invention, the rotation unit includes an actuator performing a rotation operation. In this case, automatic switch between the vertically long display and the horizontally long display can be performed by the actuator.

BRIEF DESCRIPTION OF THE DRAWINGS

The invention will be described with reference to the accompanying drawings, wherein like numbers reference like elements.

FIG. 2A is a plan view illustrating an internal structure of the head-mounted display without an exterior member, FIG. 2B is a front view, and FIG. 2C is a side view.

FIG. 3A is a plan view illustrated a mounted state of an inner frame in FIGS. 2A to 2C, FIG. 3B is a front view, and FIG. 3C is a side view.

FIGS. 6A and 6B are perspective views illustrating the display apparatus at a first posture and FIGS. 6C and 6D are perspective views illustrating the display apparatus at a second posture.

FIG. 14A is a perspective view illustrating a connection portion between the first and second column members and FIG. 14B is a perspective view illustrating the connection portion of FIG. 14A at another angle.

DESCRIPTION OF EXEMPLARY EMBODIMENTS

Hereinafter, a head-mounted display according to an embodiment of the invention will be described in detail with reference to FIG. 1 and the like.

Figure 1:
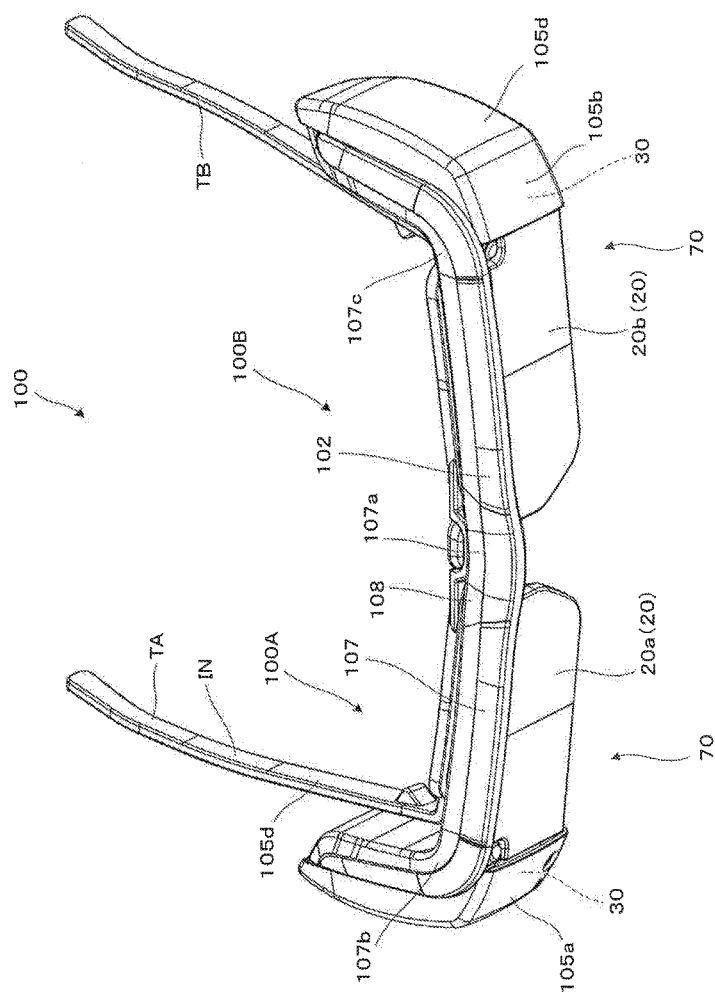
FIG. 1 is a perspective view simply illustrating the exterior of a head-mounted display including a light-guiding optical system according to an embodiment.
Figure 4A:
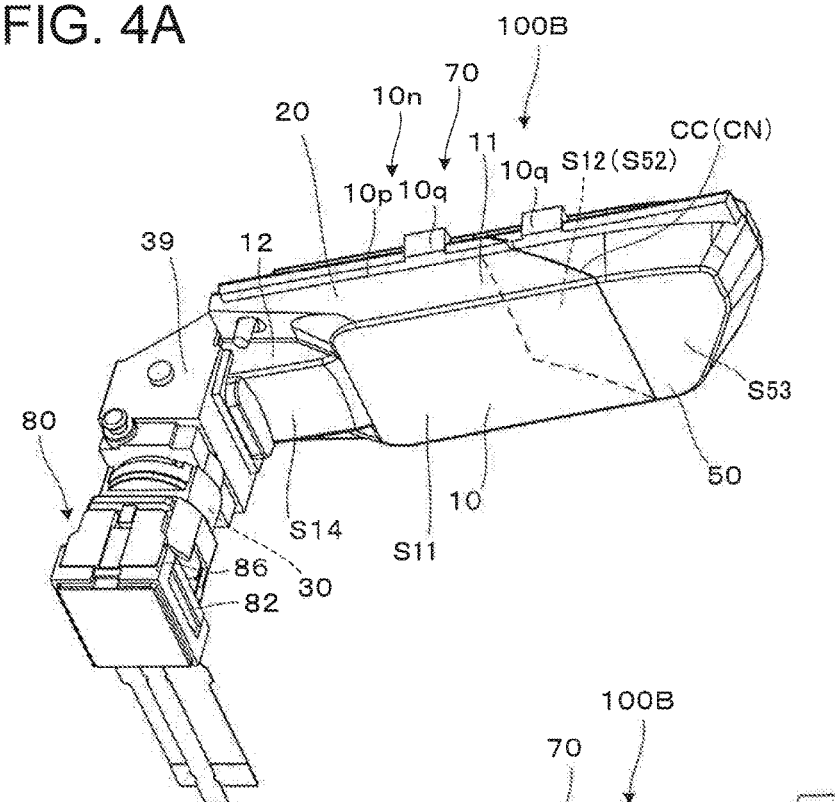
FIG. 4A is a perspective view illustrating a display apparatus and FIG. 4B is a perspective view illustrating the display apparatus of FIG. 4A at another angle.
Figure 4B:
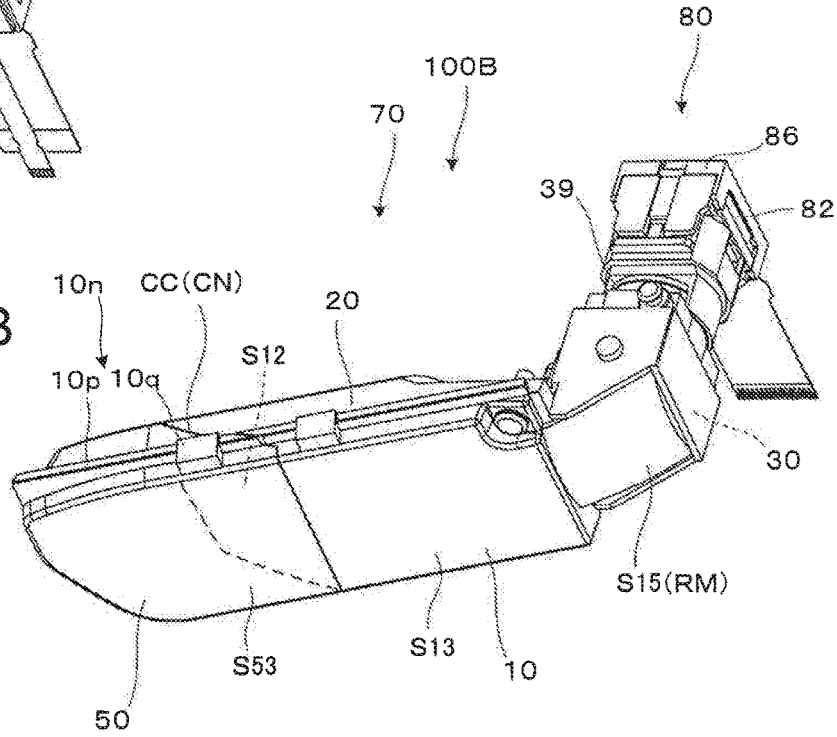

As illustrated in FIG. 1, a head-mounted display 100 including a light-guiding device according to the embodiment is a head-mounted display that has the same exterior as glasses, and is a virtual image display apparatus that enables an observer or a user mounting the head-mounted display 100 to view image light (video light) as a virtual image and enables the observer to view or observe an outside image in a see-through manner. The head-mounted display 100 includes first and second light-guiding devices 20a and 20b that screen the front of the observer so that the observer can see through the devices, a frame unit 102 that supports both of the light-guiding devices 20a and 20b, and first and second image forming body units 105a and 105b that are added to the frame unit 102. The head-mounted display 100 has one pair of right and left configurations so that binocular vision can be realized. Here, a first display apparatus 100A in which the first light-guiding device 20a and the first image forming body unit 105a on the left side of the drawing are combined is a portion that forms a right-eye virtual image and also functions as a head-mounted display alone. Further, a second display apparatus 100B in which the second light-guiding device 20b and the second image forming body unit 105b on the right side of the drawing are combined is a portion that forms a left-eye virtual image and also functions as a head-mounted display alone.

In the head-mounted display 100, an inner frame IN which can be detachably mounted on the frame unit 102 or the like and can be adjusted in accordance with the visual power or figure of the observer is provided inside the apparatus, that is, on a side coming a direct contact with the human body. By providing an exchangeable inner frame IN, the head-mounted display 100 can be used without direct contact with the noses, ears, or the like of other people, for example, when the observer selects the inner frame IN suitable for his or her figure or a plurality of observers reuse one head-mounted display 100.

FIGS. 2A to 2C illustrate the inner structure of the head-mounted display 100. When FIGS. 2A to 2C are compared to FIG. 1, the outer appearance and the interior of the head-mounted display 100 are compared. For example, each of the first and second image forming body units 105a and 105b includes a projection lens 30 accommodated in a column 39 and an image display apparatus 80 including a video display element (video element) 82. FIGS. 3A to 3C are diagrams illustrating a mounted state of the inner frame IN in FIGS. 2A to 2C. FIGS. 3A to 3C correspond to FIGS. 2A to 2C, respectively. In FIG. 3A, temples TA and TB (see FIG. 1) are not illustrated in the inner frame IN.

As the exterior and the interior are illustrated in FIGS. 1 to 3C, the frame unit 102 included in the head-mounted display 100 includes a frame 107 disposed on the upper end side and a resin unit 108 disposed on the rear side along the frame 107. The head-mounted display 100 has a configuration in which there is no frame-shaped portion on the lower side. The frame 107 included in the frame unit 102 is a member that has a slender shape bent in a D shape and includes a front surface portion 107a that extends in the right and left horizontal directions which are a direction corresponding to the line of the eyes of the observer and a pair of side surface portions 107b and 107c that extend in a depth direction which is a direction corresponding to the front and rear sides of the observer. The frame 107, that is, the front surface portion 107a and the side surface portions 107b and 107c are metal integrated-components formed of aluminum die-cast or any of other various metal materials. The resin unit 108 is disposed along the frame 107 and is fitted with the frame 107 so that, for example, various cables or the like for forming an image can be accommodated in cooperation with the frame 107. In the frame 107, the widths of the front surface portion 107a and the resin unit 108 in the depth direction are substantially the same as the thickness or width of the light-guiding device 20 corresponding to the first and second light-guiding devices 20a and 20b. On the left side of the frame 107, specifically, in a portion extending to the side surface portion 107b in the left end portion toward the front surface portion 107a, the first light-guiding device 20a and the first image forming body unit 105a are aligned and fixed directly by, for example, a fastening screw to be supported. On the right side of the frame 107, specifically, in a portion extending to the side surface portion 107c in the right end portion toward the front surface portion 107a, the second light-guiding device 20b and the second image forming body unit 105b are aligned and fixed directly by, for example, a fastening screw to be supported. The first light-guiding device 20a and the first image forming body unit 105a are mutually aligned by fitting. The second light-guiding device 20b and the second image forming body unit 105b are mutually aligned by fitting.

The frame 107 and the resin unit 108 included in the frame unit 102 support the first and second image forming body units 105a and 105b and also have a role of protecting the insides of the first and second image forming body units 105a and 105b in cooperation with an exterior member 105d with a cover shape covering the first and second image forming body units 105a and 105b. The frame 107 is separated from or loosely contacted with the upper portions except for base sides of the first and second light-guiding devices 20a and 20b (light-guiding devices 20) connected to the first and second image forming body units 105a and 105b. Therefore, even when a coefficient of thermal expansion differs between the middle light-guiding devices 20 and the frame unit 102 including the frame 107, expansion of the light-guiding devices 20 is allowed inside the frame unit 102, thereby preventing the light-guiding devices 20 from being distorted, deformed, or damaged.

For example, as illustrated in FIGS. 3A to 3C, the inner frame IN includes a pair of frame portions PA and PB into which correction glasses lenses can be inserted and temples TA and TB (see FIG. 1) on the rear side from right and left ends of the one pair of frame portions PA and PB. A nose reception unit 40 is provided to be attached to the inner frame IN. The nose reception unit 40 has a role of coming into contact with the nose of the observer to support the frame unit 102. That is, the frame unit 102 is disposed in front of the face of the observer by the nose reception unit 40 supported by the nose and the one pair of temples TA and TB supported by the ears.

Hereinafter, the first and second display apparatuses 100A and 100B will be described with reference to FIGS. 2A to 5. Hereinafter, the second display apparatus 100B for the left eye between the first and second display apparatuses 100A and 100B will be mainly described. However, the first display apparatus 100A has the same structure and function. As illustrated in FIGS. 2A to 2C, the second display apparatus 100B can be considered to include a light-guiding optical system 70 that is a projection optical system and the image display apparatus 80 that forms a video light. The light-guiding optical system 70 has a role of projecting an image formed by the image display apparatus 80 as a virtual image to an eye of the observer. The light-guiding optical system 70 includes the projection lens 30 for image formation and the second light-guiding device 20b (light-guiding device 20).

The image display apparatus 80 includes not only the video display element (video element) 82 which is transmissive spatial light modulation device but also an illumination device that is a backlight emitting illumination light to the video display element 82 and a driving control unit that controls an operation of the video display element 82 or the like (both of which are not illustrated). The video display element 82 is accommodated in a video element case 86 and is assembled in the column 39 that accommodates the projection lens 30 for image formation via the video element case 86. In other words, the column 39 serves as a connection member disposed between the video display element 82 and the light-guiding device 20. The column 39 serves as a connection member that is connected to the light-guiding device 20 and connects the light-guiding device 20 to the projection lens 30 while partially covers the light-guiding member 10 in the light-guiding device 20. The more detailed structure of the column 39 will be described below. Here, for example, a first video region RR1 conceptually illustrated in FIG. 5 in the shape of a panel surface of the video display element 82 is a rectangular region and is assumed to have a horizontally long shape with an aspect ratio of 16:9. In the embodiment, the video display element 82 forms an image of a rectangular region indicated by the first video region RR1 and the vertical and horizontal switch can be possible with a rotational operation in regard to in a longitudinal direction D1 (horizontal direction) and a transverse direction D2 (vertical direction) of the first video region RR1. That is, the image display apparatus 80 can be rotated around an optical axis to be switched from a horizontally long state (first posture), as described above, to a vertically long state (second posture) in which the longitudinal direction D1 is the vertical direction and the transverse direction D2 is the horizontal direction.

The projection lens 30 is a projection optical system that includes, for example, first to third lenses LL1 to LL3 (for example, see FIG. 9B) which are three optical elements along an incidence side optical axis (optical axis AX) as constituent elements. The projection lens 30 is accommodated in the column 39. The optical elements are aspheric lenses that include both of an asymmetric and aspheric surface (free curved surface) and a symmetric and aspheric surface (symmetric aspheric surface) and form an intermediate image corresponding to a display image of the video display element 82 inside the light-guiding member 10 in cooperation with the light-guiding member 10 of the light-guiding device 20 and then finally guides the video light toward the eye of the observer.

As described above, the light-guiding device 20 is configured to include the light guiding and see-through light-guiding member 10 and a see-through light transmission member 50. The bodies of the light-guiding member 10 and the light transmission member 50 are formed of a resin material with high optical transparency in a visible range, such as a cyclo-olefin polymer, and are reformed, for example, by injecting and solidifying a thermoplastic resin in a die. As described above, the light-guiding member 10 is a part of the prism type light-guiding device 20 and is an integrated member and can be regarded to be separated into a first light-guiding portion 11 of a light exit side and a second light-guiding portion 12 of a light incidence side. The light transmission member 50 is a member (assist optical block) that assists a see-through function of the light-guiding member 10 and serves as one light-guiding device 20 fixed to be integrated to the light-guiding member 10.

Figure 5:
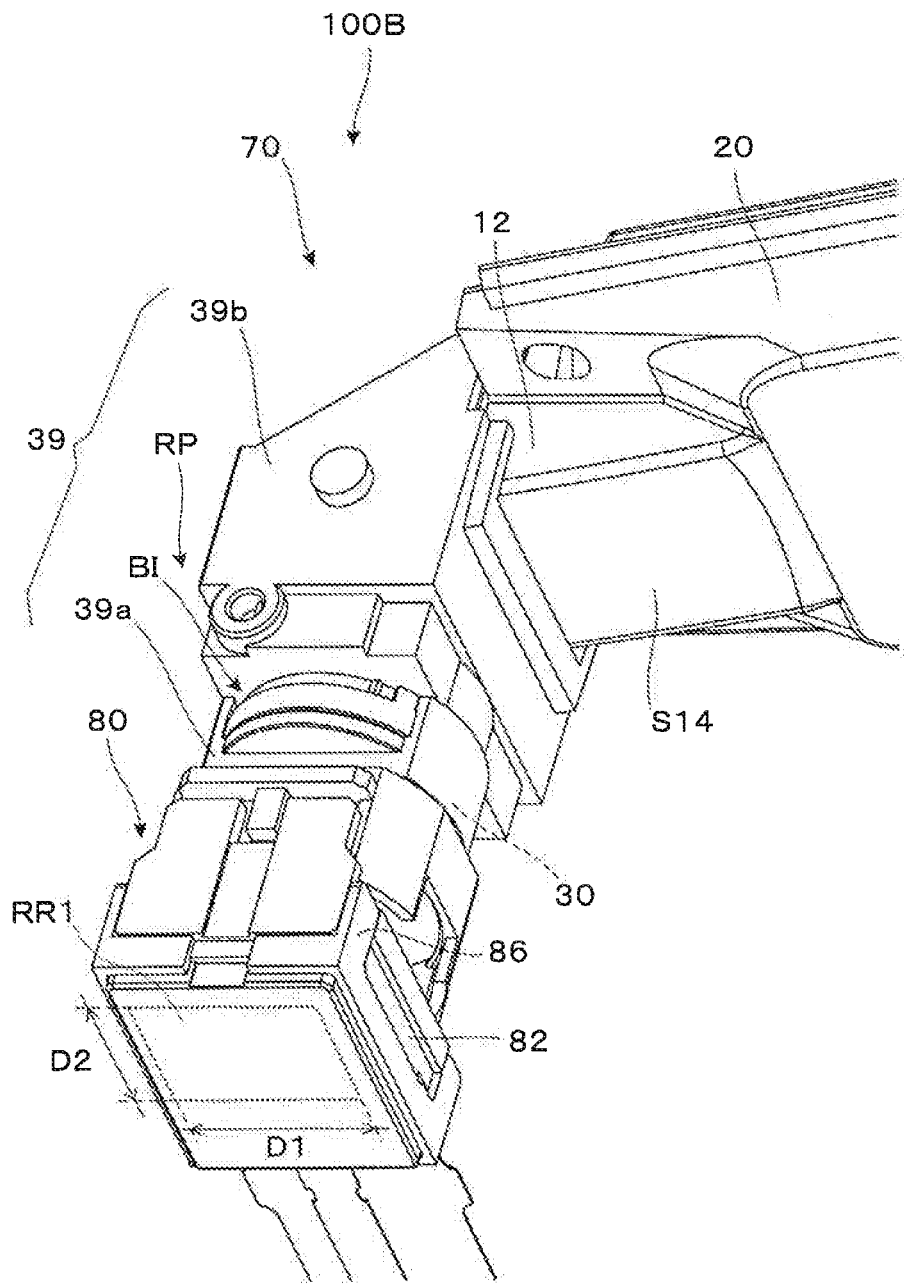
FIG. 5 is a partially enlarged perspective view illustrating the display apparatus.

Here, the foregoing optical members included in the second display apparatus 100B, that is, the light-guiding optical system 70 and the image display apparatus 80, are accommodated and fixed by the column 39 to be integrated. In particular, in the embodiment, for example, the column 39 is configured by connecting two separable members, a first column member 39a and a second column member 39b, as illustrated in FIG. 5. That is, some of optical members included in the light-guiding optical system 70 and the image display apparatus 80 are accommodated in the first column member 39a to be positioned and the remainders are accommodated in the second column member 39b to be positioned. Of the first and second column members 39a and 39b included in the column 39, the second column member 39b is assembled in the frame 107 of the frame unit 102 to be fixed. In contrast, the first column member 39a is fitted in the fixed second column member 39b to be rotatable around the optical axis AX (see FIG. 9B and the like). Accordingly, as illustrated in FIGS. 6A to 6D, a state of the horizontally long first posture at which the aspect ratio of the first video region RR1 in the video display element 82 is a ratio of 16:9 and a state of the vertically long second posture at which the aspect ratio is a ratio of 9:16 can be switched. In other words, the head-mounted display 100 includes a rotation unit RP that serves as a mechanism performing a rotation operation around the optical axis AX (see FIG. 9B and the like) on the first column member 39a accommodating the optical members included in the light-guiding optical system 70 along with the video display element 82 in a connection portion BI of the column 39.

Figures 7A, 7B:
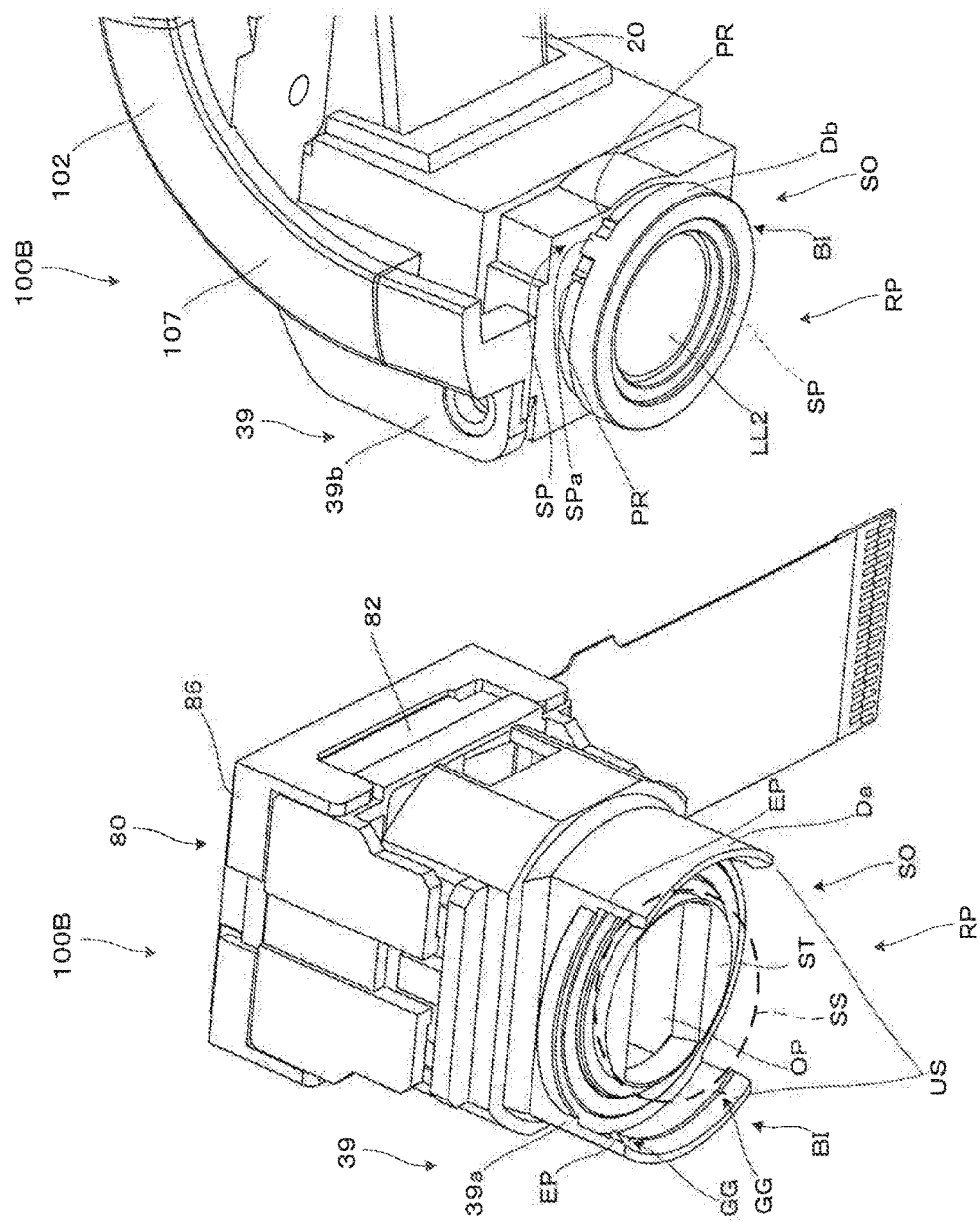
FIG. 7A is an enlarged perspective view illustrating a portion fixed to a first column member in the display apparatus and FIG. 7B is an enlarged perspective view illustrating a portion fixed to a second column member.

Hereinafter, a configuration, example of the rotation unit RP in the connection portion BI of the column 39 will be described with reference to FIGS. 7A and 7B and the like. FIG. 7A is an enlarged perspective view illustrating a form of the side of the first column member 39a in the second display apparatus 100B. FIG. 7B is an enlarged perspective view illustrating a form of the side of the second column member 39b in the second display apparatus 100B. As illustrated in the drawings, the second column member 39b is in a state in which the second column member 39b is assembled in the frame unit 102. The rotation unit RP includes a pair of uneven structures US and a pair of stoppers SP as a stopper mechanism SO in the connection portion BI in order to perform a rotation operation around the optical axis on each optical member. Although not illustrated, the rotation unit RP includes not only the one pair of uneven structures US and the one pair of stoppers SP as the stopper mechanism SO but also an actuator (by a micro motor, for example) that performs a rotation operation (not illustrated), as necessary. First, as illustrated in FIG. 7A, the one pair of uneven structures US included in the rotation unit RP are provided in a fitting portion Da which is a portion (a fitting portion with the second column member 39b) on the front end side of the first column member 39a. On the other hand as illustrated in FIG. 7B, the one pair of stoppers SP included in the rotation unit RP are provided in a fitting portion Db which is a portion (a fitting portion with the first column member 39a) on the front end side of the second column member 39b. The rotation amounts of edge portions EP of the one pair of uneven structures US provided to face each other are regulated by the one pair of stoppers SP, so that the first column member 39a can be rotated at 90° around the optical axis with respect to the second column member 39b fixed to the frame unit 102. That is, the one pair of uneven structures US and the one pair of stoppers SP configuring the stopper mechanism SO function to regulate a rotation range, that is, a rotatable angle (90° in the above case), in the rotation unit RP that performs the rotation operation on each optical member.

As illustrated, in the one pair of stoppers SP related to a rotation direction, small protrusions PR are provided before and after a stopper body SPa. In the one pair of uneven structures US, grooves GG may be provided in the inner surface side of the one pair of uneven structures US to correspond to the small protrusions PR. When the small protrusions PR hit against the grooves GG, a small impact occurs. Thus, immediately before a stopper position which is a position at which the rotation of 90° around the optical axis stops, the sense of click or a click sound can be provided (that is, the end of the rotation operation is delivered to the observer).

Here, as illustrated in FIG. 7A, in the embodiment, a stop ST is provided to be attached to the projection lens 30 is included as one of the optical members rotated together with the first column member 39a by the rotation unit RP. The stop ST has an opening OP with a shape corresponding to the shape of the panel surface (see the first video region RR1 in FIG. 5 or the like) in the video display element 82, that is, the shape of the emission surface of video light. Specifically, as illustrated, the shape of the opening OP is an elliptical shape extending long in a direction oriented along the longitudinal direction to correspond to the horizontally long first video region RR1 illustrated in FIG. 5 or the like. Accordingly, by performing a light-shielding process on the video light from the first video region RR1 efficiently and accurately, for example, occurrence of stray light can be suppressed. In the embodiment, a mechanism rotating the stop ST along with the video display element 82 in the rotation of the video display element 82 is realized. Accordingly, a relation between the shape of the panel surface in the video display element 82 and the shape of the opening OP is maintained without change in the rotation operation. Therefore, even when an image with a horizontally long aspect ratio in the first posture state is shown and even when an image with a vertically long aspect ratio in the second posture state is shown, occurrence of stray light can be suppressed. Thus, the guiding of the video light by the light-guiding optical system 70 can be maintained in a good state, and thus good image display can be realized.

Figure 8:
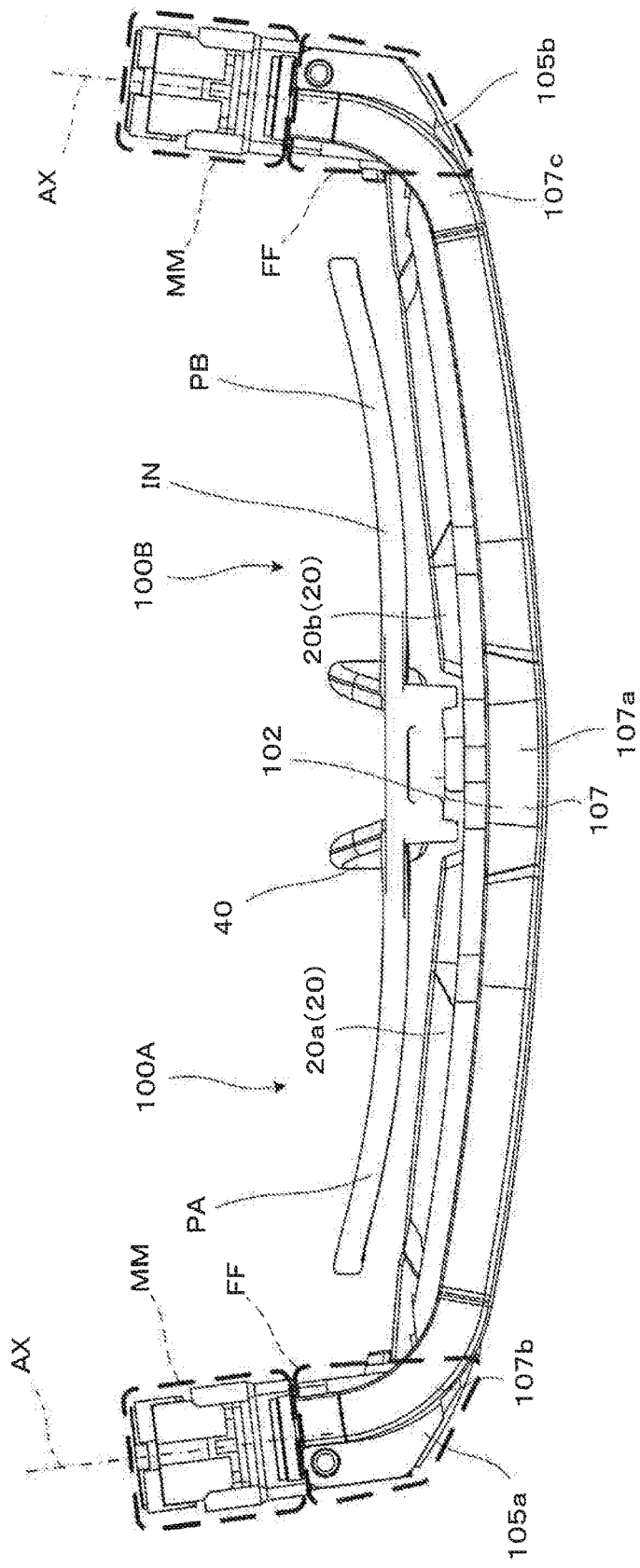
FIG. 8 is a diagram illustrating movable portions and fixed portions of the columns in the head-mounted display.

FIG. 8 is a diagram illustrating movable portions MM and fixed portions FF in the head-mounted display 100. That is, the movable portion MM is a portion connected to the first column member 39a of the column 39 and the fixed portion FF is a portion connected to the second column member 39b of the column 39. As illustrated, the movable portions MM rotated by the rotation units RP described above are disposed on the rear end side (which is a side close to the ears at the time of mounting) in the display apparatuses 100A and 100B provided as a pair of right and left apparatuses. On the other hand, the fixed portions FF are fixed to the frame 107 of the frame unit 102. In the embodiment, when binocular vision is possible by providing a pair of right and left display apparatuses 100A and 100B as in the embodiment, the rotation operation by the rotation units RP can be considered to be performed right and left in a synchronization manner. Therefore, for example, an actuator may be included as a mechanism included in the rotation unit RP and one pair of movable portions MM present right and left may be rotated in a synchronization manner by the actuator.

Figure 9A:
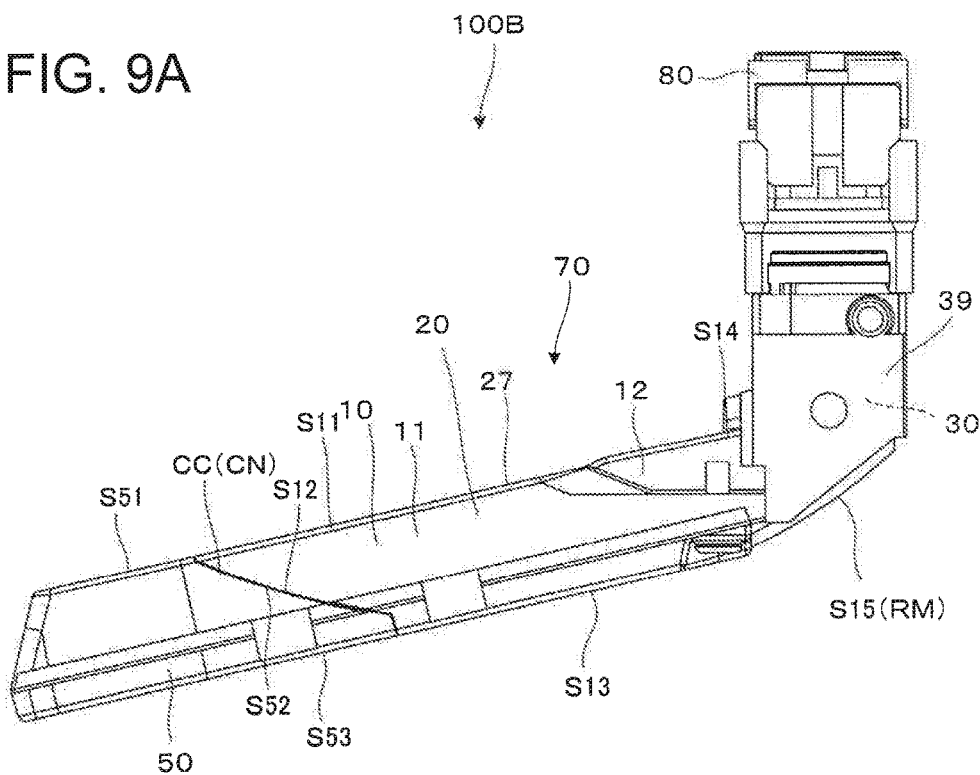
FIG. 9A is a plan view illustrating the display apparatus and FIG. 9B is a sectional view.
Figure 9B:
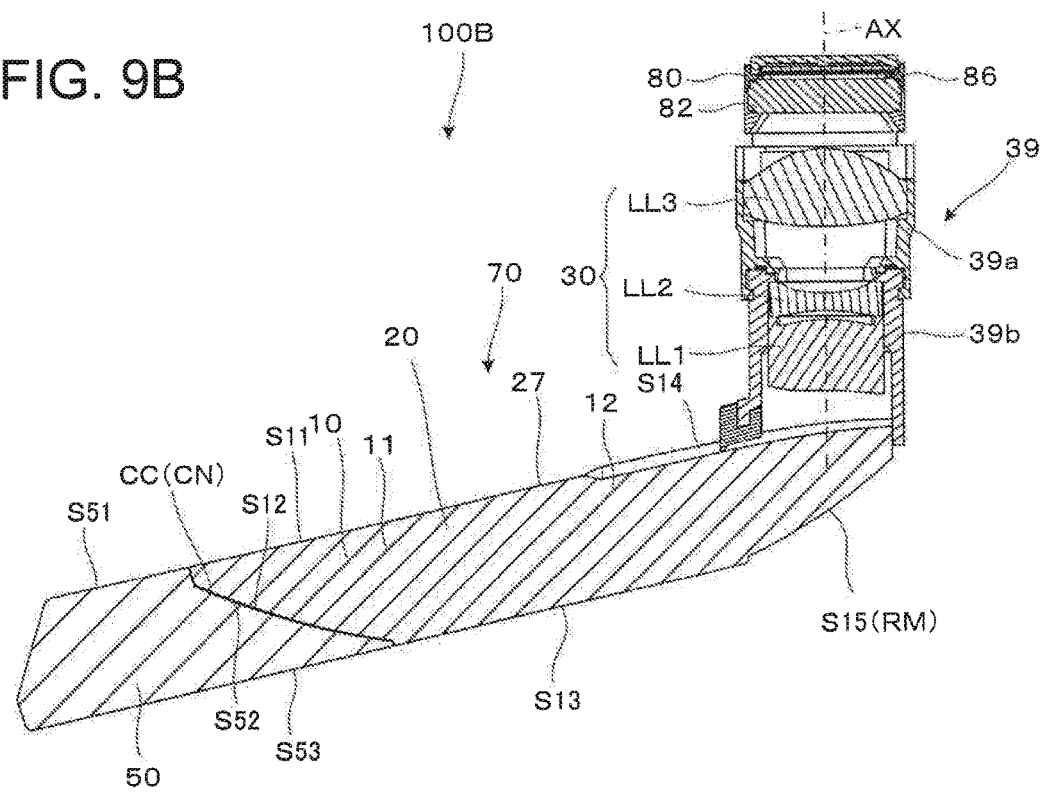

Hereinafter, the configuration of the light-guiding optical system 70 guiding the video light emitted from the image display apparatus 80 will be described in detail with reference to FIGS. 9A and 9B and the like.

First, the light-guiding device 20 will be described in detail with reference to FIGS. 9A and 9B and FIGS. 10A to 10C. As described above, the light-guiding device 20 is configured to include the light-guiding member 10 and the light transmission member 50. In the light-guiding member 10 of these members, a middle side (eye front side) portion close to the nose extends in a straight-line shape in a plan view. In the light-guiding member 10, the first light-guiding portion 11 disposed on the middle side close to the nose, that is, a light emission side, includes a first surface S11, a second surface S12, and a third surface S13 as side surfaces having an optical function. The second light-guiding portion 12 disposed on the peripheral side distant from the nose, that is, the light incidence side, includes a fourth surface S14 and a fifth surface S15 as side surfaces having an optical function. Of these surfaces, the first surface S11 and the fourth surface S14 are continuously adjacent, and the third surface S13 and the fifth surface S15 are continuously adjacent. The second surface S12 is disposed between the first surface S11 and the third surface S13, and the fourth surface S14 and the fifth surface S15 are adjacent at a large angle. Here, the first surface S11 and the third surface S13 disposed to face each other have mutually substantially parallel planar shapes. On the other hand, the other surfaces having the optical function, that is, the second surface S12, the fourth surface S14, and the fifth surface S15, are formed as asymmetric curved surfaces (free surfaces). A half mirror layer is attached to the second surface S12 among these surfaces. The half mirror layer is a reflection film with optical transparency (that is, a half transmission and reflection film) formed by forming a metal reflection film or a dielectric multi-layer film. From the viewpoint of facilitating observation of outside light in a see-through manner, the reflectance of the video light is set to, for example, 20% and transmittance of the video light is set to, for example, 80%. The fifth surface S15 is formed by forming a light reflection film RM formed of an inorganic material and functions as a reflection surface.

In the light-guiding device 20, the light-guiding member 10 is joined by bonding the light transmission member 50 via an adhesion layer CC. A joining surface of the light-guiding member 10 and the light transmission member 50 and a portion configured by the adhesion layer CC are referred to as a joining portion CN.

The light transmission member 50 includes a first transmission surface S51, a second transmission surface S52, and a third transmission surface S53 as side surfaces having an optical function. Here, the second transmission surface S52 is disposed between the first transmission surface S51 and the third transmission surface S53. The first transmission surface S51 is present on an extension surface of the first surface S11 of the light-guiding member 10, the second transmission surface S52 is a curved surface joined and integrated to the second surface S12 by the adhesion layer CC, and the third transmission surface S53 is present on an extension surface of the third surface S13 of the light-guiding member 10. Of these surfaces, the second transmission surface S52 and the second surface S12 of the light-guiding member 10 are integrated by joining through the thin adhesion layer CC, and therefore have a shape of substantially the same curvature.

The light-guiding device 20 is formed by joining a base material to become the light-guiding member 10 and the light transmission member 50 by the joining portion CN, and then coating the joined base material through a dipping process. That is, a hard coat layer 27 of the light-guiding member 10 is provided in the entire light-guiding device 20 along with the light transmission member 50. The light-guiding device 20 is assembled and fixed such that a front end portion located on a light source side (base side) is fitted to an end portion 39t (see FIGS. 2A to 2C and the like) of the second column member 39b in the column 39.

Figure 10A:
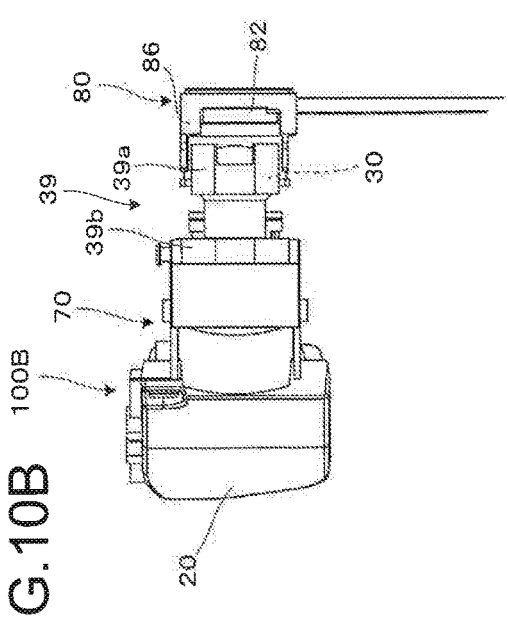
FIG. 10A is a front view illustrating the display apparatus.
Figure 10B:
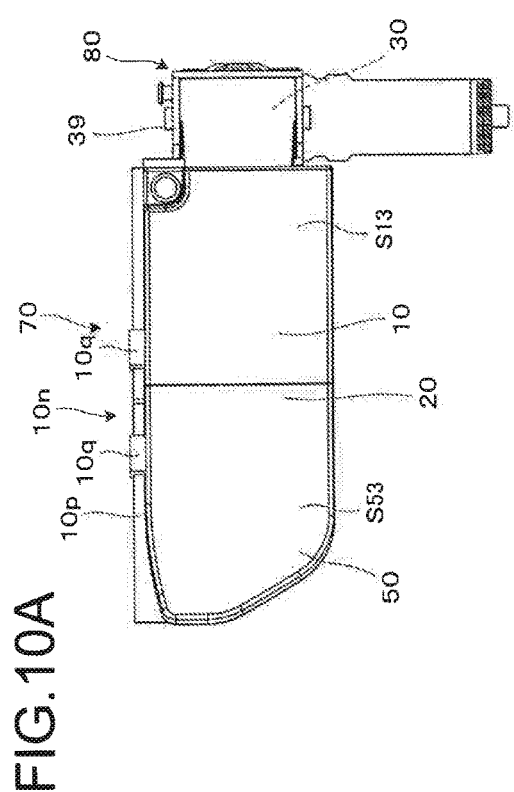
FIG. 10B is a side view.

The structure of the light-guiding device 20 is set to a structure other than the foregoing optical structure. For example, as illustrated in FIG. 10A, a rib 10n is formed on the upper side. The rib 10n has a structure in which a plurality of rib portions (convex portions) 10p and a plurality of widened portions (convex portions) 10q are alternately connected and extends to elongate straightly overall along the edge of the light-guiding device 20. The rib 10n is formed on the upper side close to the frame 107 (see FIGS. 1 to 2C) so that alignment of the light-guiding device 20 to the frame 107 is possible.

Figure 10C:
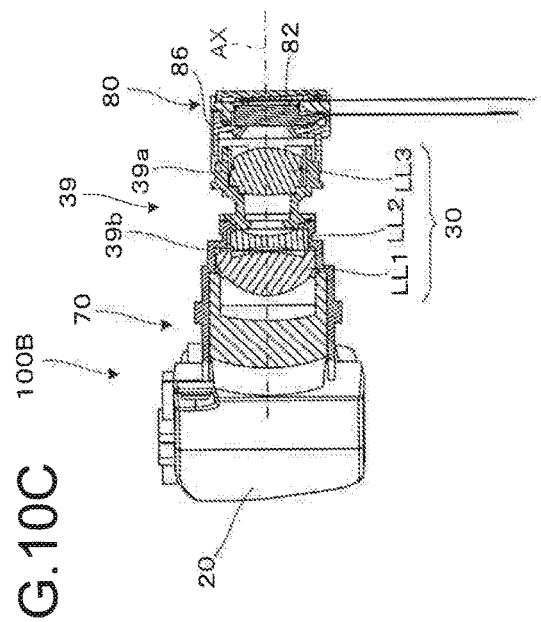
FIG. 10C is a sectional side view.

Next, the projection lens 30 will be described in detail with reference to FIGS. 9B and 10C. As described above, the projection lens 30 includes the first lens LL1 to the third lens LL3 as constituent elements along the incident side optical axis and these lenses are accommodated in the column 39. Of the constituent elements, the first lens LL1 disposed on a relatively downstream side of the optical path includes an asymmetric curved surface (free surface) as a lens surface. On the other hand, the second lens LL2 and the third lens LL3 disposed on a relatively upstream side of the optical path include only symmetric spherical or aspheric surfaces as lens surfaces. Here, as illustrated, of the first lens LL1 to the third lens LL3, the third lens LL3 is accommodated in the first column member 39a, and the first lens LL1 and the second lens LL2 are accommodated in the second column member 39b.

In the case of the above-described configuration, of the light-guiding device 20 and the projection lens 30 included in the light-guiding optical system 70, only the third lens LL3 of the projection lens 30 is rotated along with, the image display apparatus 80 and the stop ST (see FIG. 7A) in the rotation operation of the first column member 39a by the rotation unit RP. In this case, the rotating third lens LL3 is configured to include only the symmetric spherical or aspheric surface as a lens surface. The first lens LL1 of the projection lens 30 and the light-guiding device 20 including the asymmetric curved surface (free surface) is not rotated and its posture is not changed. Accordingly, even when the axis rotation is performed around the optical axis AX by the rotation unit RP, an optical operation (refraction and reflection operation) on the video light of the light-guiding optical system 70 is not changed. When the above description is said from the viewpoint of a relation between the column 39, and the light-guiding optical system 70 and the image display apparatus 80, the first column member 39a in the column 39 is connected to the image display apparatus 80 and accommodates the third lens LL3 (symmetric lens) configured with only the symmetric curved surface in the light-guiding optical system 70. The second column member 39b accommodates the optical members (asymmetric lenses) having the asymmetric curved surfaces, such as the first lens LL1 or the light-guiding device 20, in the light-guiding optical system 70. On the other hand, by rotating the third lens LL3 which is an optical member between the image display apparatus 80 to the stop ST for each first column member 39a accommodated integrally along with the stop ST and the image display apparatus 80 using the fact that the third lens LL3 is the symmetric curved surface, the rotation can be performed with high precision in a simple structure.

Figure 11:
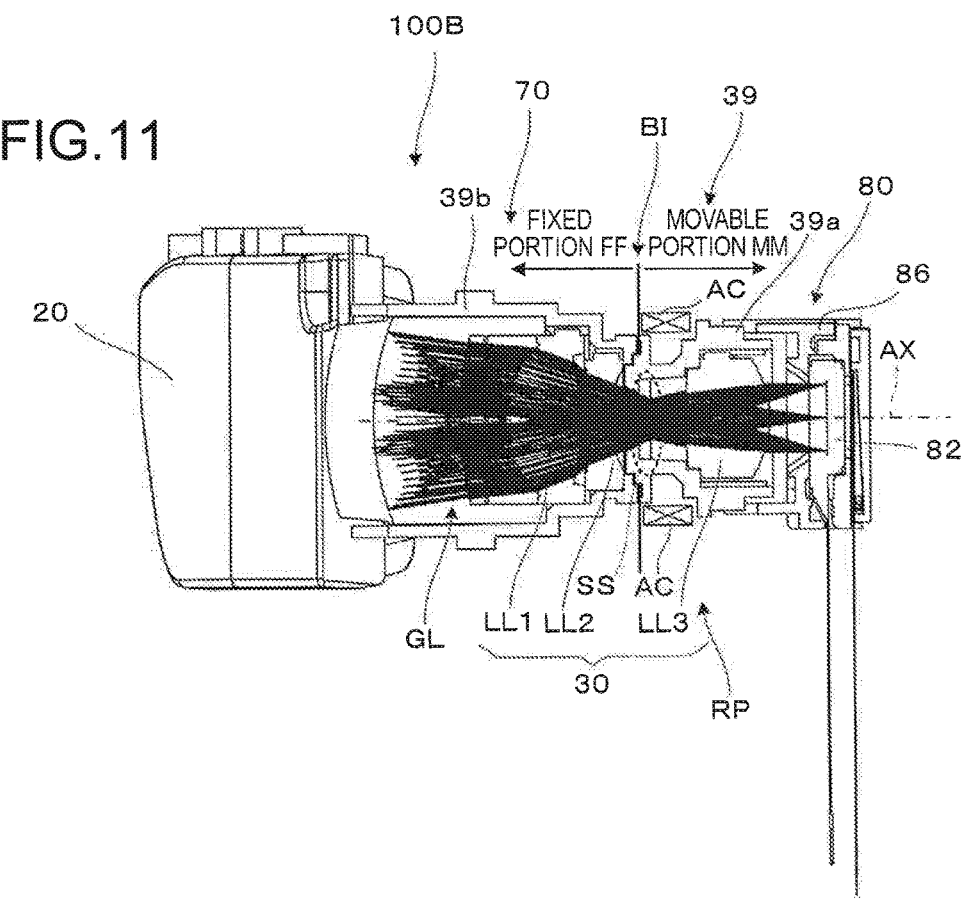
FIG. 11 is a diagram illustrating a form of a pencil of light rays of video light inside the column.

FIG. 11 is a diagram illustrating a form of a pencil of light rays of the video light emitted from the panel surface of the video display element 82 inside the column 39. As illustrated, in the video light GL, the diameter of entire pencil of light rays is the smallest near a stop portion SS in which the stop ST (see FIG. 7A) is provided. In the case of the embodiment, the stop ST is provided on the front end side of the first column member 39*a*. As illustrated in FIG 11, the connection portion BI of the first column member 3 9*a* (that is, the fixed portion FF) and the second column member 39*b* (that is, the movable portion MM) included in the column 39 is disposed near the stop portion SS in which the diameter of the entire pencil of light rays is the smallest, that is, in a constricted spot in which the diameter of the column 39 is the smallest. Accordingly, for example, as illustrated, it is easy to ensure an installation space when an actuator AC (for example, a micro motor) or another mechanism (for example, a gear for the rotation operation) other than the actuator AC included in the rotation unit RP is provided. Since the stop ST integrally molded along with the column 39 is provided in this spot, it is not necessary to provide a lens or the like. Therefore, it is not necessary to perform UV adhesion in a manufacturing process.

Figure 12:
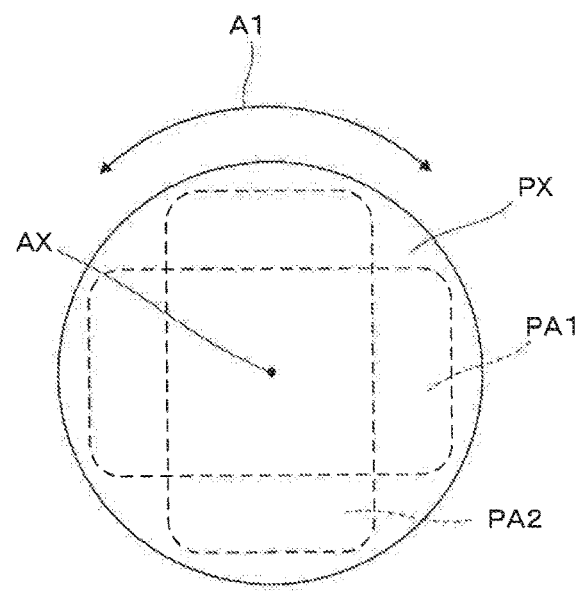
FIG. 12 is a diagram conceptually illustrating an effective region in which the video light of an optical member is guided at the first and second postures.

In the head-mounted display 100, a sufficiently large effective region in which the video light is guided in the optical system included in the light-guiding optical system 70 is set in order to ensure guiding of the video light in both of the first posture (horizontally long image display) illustrated in FIGS. 6A and 6B and the second posture (vertically long image display) illustrated in FIGS. 6C and 6D. That is, when the effective region of the optical member is viewed in a surface vertical to the optical axis AX in regard to the effective region of all the optical members included in the light-guiding optical system 70, as illustrated in FIG. 12, an effective region PX including effective regions PA1 and PA2 of both an effective region PA1 necessary to guide the video light at the first posture and an effective region PA2 necessary to guide the video light of the optical member at the second posture in the switch between the first and second postures indicated by an arrow A1 is ensured in each optical member. In the illustrated example, the effective region PX is a circular region that has a radius sufficient to include the effective regions PA1 and PA2 centering on the optical axis AX. The effective region of the third lens LL3 integrally rotated along with the image display apparatus 80 and the stop ST using the symmetric curved surface may not necessary satisfy the condition shown in the effective region PX. For example, an effective region with no circular shape may be adopted.

Figure 13:
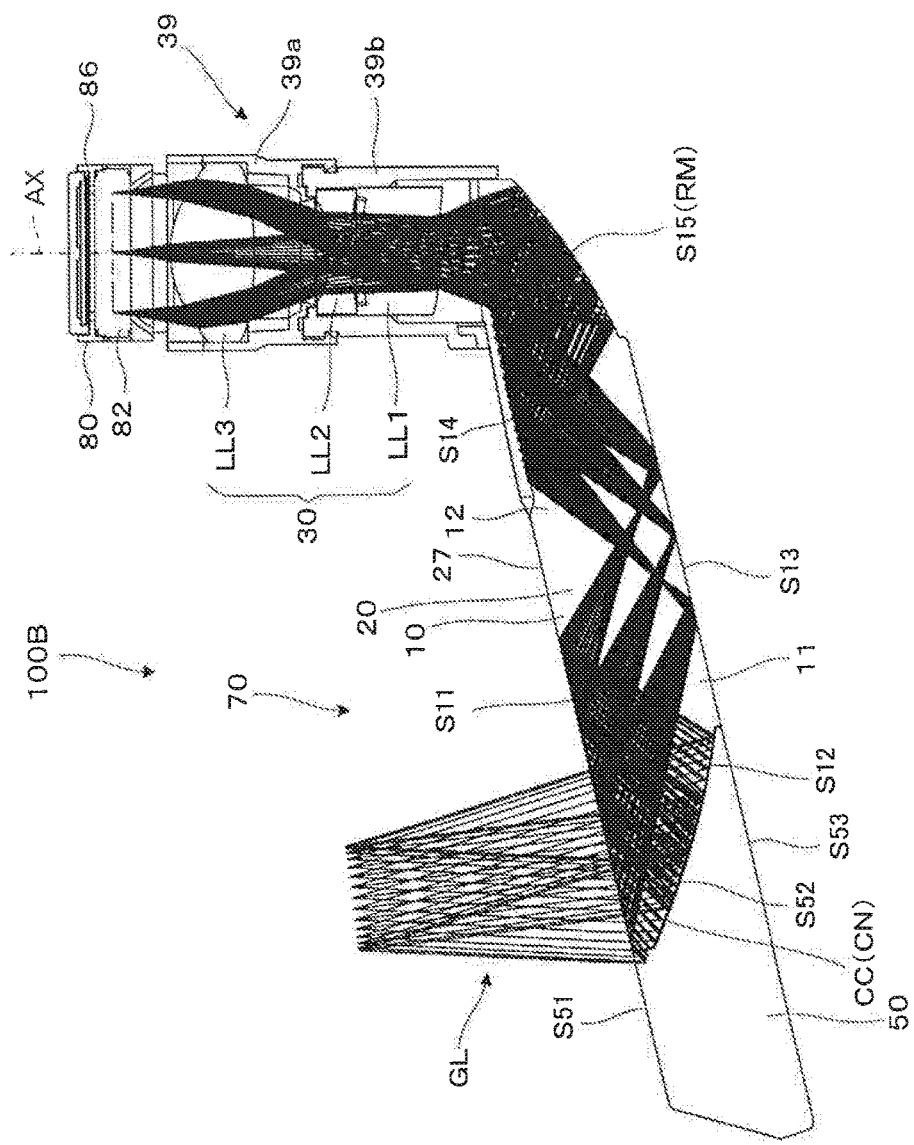
FIG. 13 is a diagram illustrating an optical path of the video light.

Hereinafter, an example of the optical path of the video light or the like will be described with reference to FIG. 13 based on the head-mounted display 100 with the foregoing configuration.

The video light GL emitted from the image display apparatus 80 is incident on the fourth surface S14 provided in the light-guiding member 10 of the light-guiding device 20, while passing through the projection lens 30 including the first lens LL1 in the light-guiding optical system 70 to converge. The video light GL passing through the fourth surface S14 travels while converging, is reflected by the fifth surface S15, and is incident again from the inside to be reflected by the fourth surface S14. The video light GL reflected by the fourth surface S14 is incident on the third surface S13 to be totally reflected and is incident on the first surface S11 to be totally reflected. Here, the video light GL forms an intermediate image in the light-guiding member 10 before and after passing through the third surface S13. An image surface of the intermediate image corresponds to an image surface of the video display element 82. The video light GL totally reflected by the first surface S11 is incident on the second surface S12. However, in particular, the video light GL incident on the half mirror layer provided in the second surface S12 is partially reflected while partially transmitted through the half mirror layer, and is incident again to pass through the first surface S11. The video light GL passing through the first surface S11 is incident as a substantially parallel light flux on the pupil of an eye of the observer or its equivalent position. That is, the observer observes an image formed on the video display element (video element) 82 by the video light which is a virtual image.

On the other hand, for the outside light, since the third surface S13 and the first surface S11 are mutually substantially parallel planes and the third transmission surface S53 extended from the third surface S13 and the first transmission surface S51 extended from the first surface S11 are present, aberration or the like rarely occurs and an outside image with no distortion is observed by the observer. In this way, the light-guiding device 20 is configured as a see-through optical system that superimposes video light and outside light.

Hereinafter, assembly of the first display apparatus 100A and the second display apparatus 100B included in the head-mounted display 100 will be described in brief with reference to FIG. 14. First, one pair of fixed portions FFa and FFb (FF) and one pair of movable portions MMa and MMb (MM) included in the display apparatuses 100A and 100B can be separately assembled. Of these portions, the fixed portions FFa and FFb which are portions connected to the second column member 39*b* of the column 39 are each assembled and fixed to the frame unit 102. Thereafter, the movable portions MMa and MMb are assembled in the fixed portions FFa and FFb corresponding to the movable portions MMa and the MMb. More specifically, the fitting portion Da of the corresponding first column member 39*a* and the fitting portion Db of the second column member 39*b* are fitted to each other to be fitted rotatably.

As described above, the head-mounted display 100 according to the embodiment can display an image by rotating the optical members including the image display apparatus 80 by the rotation unit RP and changing the aspect ratio. At this time, the rotation unit RP rotates the stop ST having the opening OP with the shape corresponding to the shape of the emission surface of the video light in the video display element 82 which is the video element of the image display apparatus 80 along with the image display apparatus 80. Accordingly, even when an image with a horizontally long aspect ratio is shown and even when an image with a vertically long aspect ratio is shown, occurrence of stray light can be suppressed. Thus, the guiding of the video light by the light-guiding optical system 70 can be maintained in a good state, and thus good image display can be realized.

Others

Figure 15:
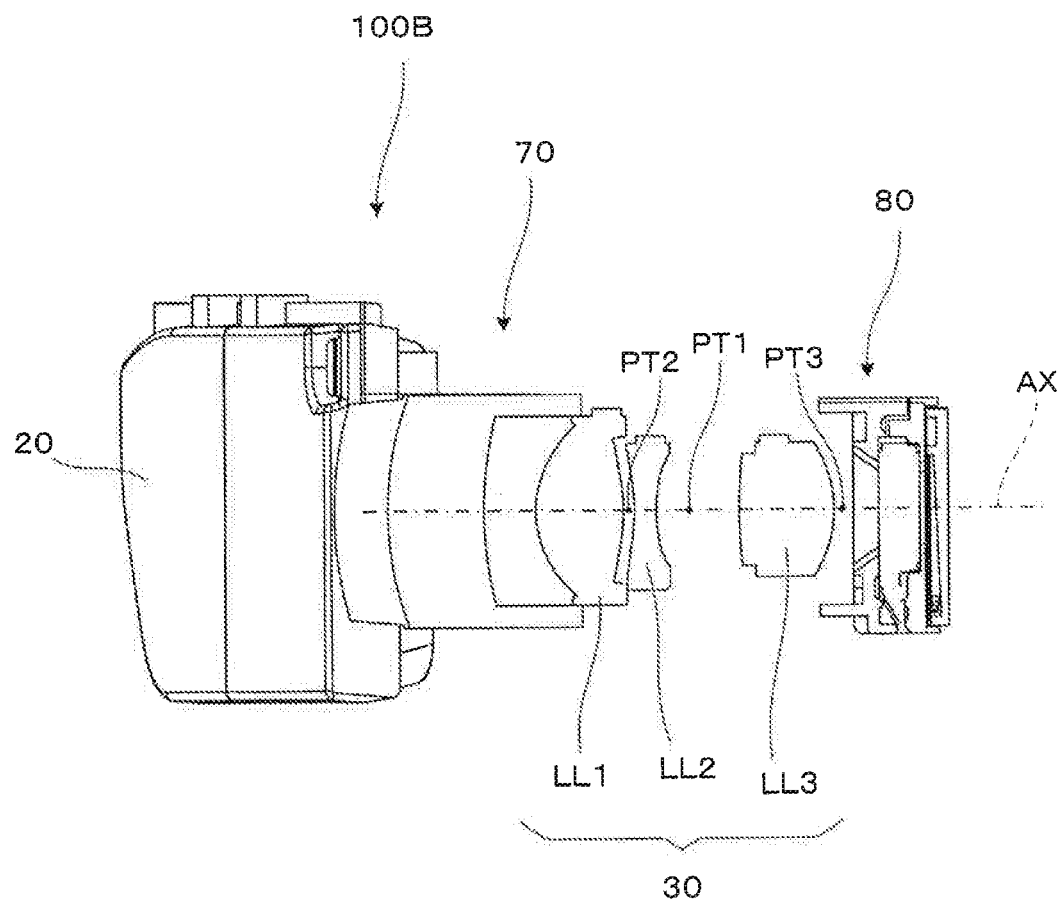
FIG. 15 is a diagram illustrating a modification example of the optical member which is a rotation target.

The invention has been described according to the embodiments, but the invention is not limited to the foregoing embodiments and can be realized in various forms within the range of the invention without departing from the gist of the invention. For example, in the foregoing embodiment, the movable portions MM and the fixed portions FF are provided using the position of the stop ST or a position close to the stop ST as the criterion. However, it can be variously set where the movable portions MM and the fixed portions FF are provided in the optical members included in the light-guiding optical system 70. For example, as illustrated in the example of FIG. 15, in the head-mounted display 100 according to the embodiment or a head-mounted display having the same configuration, the movable portions MM and the fixed portions FF can be considered to be decided using rotation points PT1 to PT3 on the optical axis AX as criterions. Specifically, in the embodiment, the movable portions MM and the fixed portions FF are decided using the rotation point PT1 as the criterion in the drawing. That is, the movable portion MM and the fixed portion FF are separated using a position between the second lens LL2 and the third lens LL3 of the projection lens 30 and, particularly, the vicinity of the stop portion SS in which the stop ST is present, as a boundary. However, the invention is not limited to the rotation point PT1. For example, as illustrated, the rotation point PT2 is used as a criterion. That is, the movable portion MM and fixed portion FF may be separated using a position between the first lens LL1 and the second lens LL2 of the projection lens 30 as a boundary. In the foregoing example, not only the third lens LL3 but also the second lens LL2 is configured to include only the symmetrical spherical or aspheric surface (symmetric curved surface) as a lens surface. Accordingly, when the first and second column members can be separated using the rotation point PT2 as the criterion in the column and a sufficient space can be ensured to provide each mechanism included in the rotation unit, the movable portion MM and the fixed portion FF may be separated using the rotation point PT2 as the criterion. For example, when all of the lenses LL1 to LL3 included in the projection lens 30 include asymmetric curved surfaces (free curved surfaces), the rotation point PT3 is used as the criterion. That is, the movable portion MM and the fixed portion FF may be separated using a position between the third lens LL3 and the image display apparatus 80 as the boundary. In this case, for the stop ST, for example, another mechanism performing rotation in synchronization with the image display apparatus 80 may be provided for rotation. The foregoing light-guiding optical system 70 is an example. For example, the number of lenses included in the projection lens 30 can be set variously. Even in this case, the lens other than the asymmetric curved surface (free curved surface) can be rotated along with the image display apparatus 80 or the like. The projection lens 30 may not include the asymmetric curved surface (free curved surface) and the entire projection lens 30 may be rotated along with the image display apparatus 80 or the like.

Figure 16:
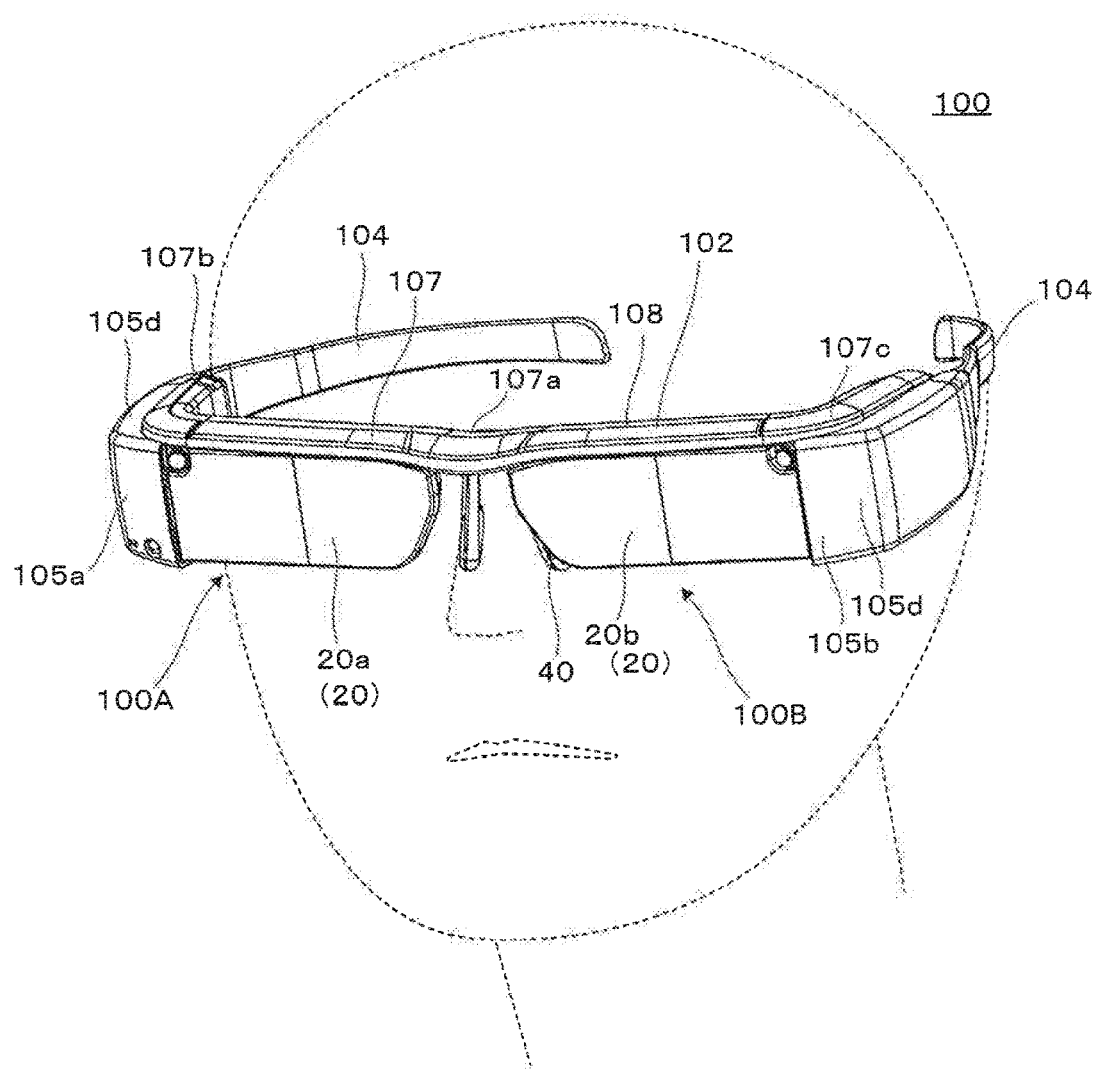
FIG. 16 is a perspective view illustrating a modification example of the head-mounted display.

As the structure of the head-mounted display, the inner frame may not be included as in a modification example illustrated in FIG. 16 in addition to the foregoing structure. Specifically, a head-mounted display 100 illustrated in FIG. 16 includes first and second light-guiding devices 20a and 20b that screen the front of an observer so that the observer can see through the devices, a frame unit 102 that supports both of the light-guiding devices 20a and 20b, first and second image forming body units 105a and 105b that are added to portions extending from both of the right and left ends of the frame unit 102 to temples 104 on the rear side, and a nose reception unit 40. The head-mounted display 100 has one pair of right and left configurations so that binocular vision can be realized. In the example illustrated in FIG. 16, for example, an inner frame with no temples (an inner frame configured such that the temples not illustrated in FIG. 3A are not actually present) may be provided.

The head-mounted display 100 can include a conversion control unit that receives instruction information from the outside and performs vertical and horizontal conversion control in the rotation operation by the rotation unit RP based on the instruction information in the switch between a case in which a horizontally long image is shown and a case in which a vertically long image is shown. In this case, for example, in addition to the operation by the rotation unit RP, a correction process can also be performed through image processing in the conversion control unit. For example, as described above, 90° rotation is performed by the rotation unit RP to switch the horizontal long display and the vertically long display. However, when 90° or more rotation is desired to be rotated, an image correction process may be performed on an amount of the 90° or more rotation.

To perform the correction process through image processing, a detection unit such as a switch may be provided in the rotation unit RP and a control unit performing image control of the head-mounted display 100 may perform necessary correction process based on a detection signal indicating the horizontally long display or the vertically long display detected from the detection unit.

The switch between the horizontally long display and the vertically long display can be performed in conjunction with various kinds of control. For example, the control of the switch can be performed according to a signal indicating that input image information is appropriate for a vertically long image for a smartphone or the like. More specifically, for example, when it is determined that an apparatus connected to the head-mounted display 100 is a smartphone or the like, automatic switch can be considered to be performed.

According to an image display method, the switch between the horizontally long display and the vertically long display may be performed. For example, when display is performed on only an upper side of the entire display screen, the horizontally long display is set. When display is performed on only a lateral side (left side or right side) of the entire display screen, it is considered that control is performed to perform switch such that the vertically long display is set.

As described above, the intermediate image corresponding to a display image of the video display element 82 is formed inside the light-guiding member 10, the invention can also be applied to a head-mounted display that performs see-through without forming an intermediate image.

As described above, as the image display apparatus 80, the video display element 82 configured by a transmissive liquid crystal display device or the like is used. However, various elements can be used as the image display apparatus 80 without being limited to the video display element 82 configured by a transmissive liquid crystal display device or the like. For example, a reflective liquid crystal display device can also be used, or a digital micro-mirror device or the like can also be used instead of the video display element 82 configured by a liquid crystal display device or the like. As the image display apparatus 80, a self-luminous element typified by an LED array or an OLED (organic EL) can also be used.

In the foregoing embodiment, the image display apparatus 80 configured by a transmissive liquid crystal display device or the like is used. However, instead of the transmissive liquid crystal display device, a scanning image display device can also be used.

As described above, the head-mounted display 100 including one pair of display apparatuses 100A and 100B has been described but a single display apparatus can be used. That is, one pair of the light-guiding optical system 70 and the image display apparatus 80 may not be provided to correspond to both of the right and left eyes, but the light-guiding optical system 70 and the image display apparatus 80 may be provided for only one of the right and left eyes so that monocular vision of an image is realized. In the case of the monocular vision, there is no concept that a display state (a horizontally long state or a vertically long state) is matched with right and left eyes unlike binocular vision. Accordingly, for example, the rotation operation by the rotation unit RP may be simplified manually. On the other hand, the rotation operation can also be performed manually in the case of binocular vision. In this case, for example, an interlocking mechanism realized by, for example, a gear mechanism can be provided so that the rotation operation is performed in synchronization with both right and left.

As described above, the light-guiding member 10 or the like extends in the lateral direction in which the eyes are arranged, but the light-guiding member 10 can also be disposed to extend in the vertical direction. In this case, the light-guiding member 10 has a parallel disposition structure in parallel rather than in series.

Only the form in which the image light and the outside light are superimposed has been described above. However, for example, the invention may be applied to a display apparatus causing only image light to be viewed and causing outside light not to be observed.

As described above, in the stop ST, the shape of the opening OP has the elliptical shape which is horizontally long and is symmetric in the vertical and horizontal directions, as illustrated in FIG. 5. However, the invention is not limited thereto, but the opening OP can have any of various shapes. When the opening OP has a vertically symmetric and horizontally asymmetric shape, for example, light shielding may be performed to suppress occurrence of ghost light. The disposition spot of the stop ST is not limited to the foregoing example as long as a rotatable mechanism is provided, but the stop ST can be disposed at any of various spots.

The entire disclosure of Japanese Patent Application No. 2015-062195, filed Mar. 25, 2015 is expressly incorporated by reference herein.

What is claimed is:

1. A head-mounted display comprising:
   a video element that generates image light;
   a light-guiding optical system that guides the image light from the video element;
   a stop that has an opening with a shape corresponding to a shape of an emission surface of the image light in the video element; and
   a rotation unit that rotates the stop along with the video element.

2. The head-mounted display according to claim 1, wherein the video element forms an image of a rectangular region and is able to switch between vertical and horizontal postures in regard to a longitudinal direction and a transverse direction of the rectangular region with a rotation operation performed by the rotation unit.

3. The head-mounted display according to claim 2, wherein the light-guiding optical system has an effective region in which the image light is guided both vertically and horizontally in the vertical and horizontal switch by the rotation of the video element.

4. The head-mounted display according to claim 1, wherein the light-guiding optical system includes a symmetric curved surface and an asymmetric curved surface as optical surfaces passing the image light from the video element, and
wherein the rotation unit rotates an optical member having the symmetric curved surface among optical members included in the light-guiding optical system.

5. The head-mounted display according to claim 4, wherein the light-guiding optical system includes a symmetric lens having the symmetric curved surface as an optical surface and an asymmetric lens having the asymmetric curved surface as an optical surface, and
wherein the rotation unit rotates the video element to the symmetric lens.

6. The head-mounted display according to claim 1, wherein the rotation unit performs a rotation operation around an optical axis of the light-guiding optical system.

7. The head-mounted display according to claim 1, further comprising:
a column that fixes a plurality of optical members included in the light-guiding optical system,
wherein the column is connected to the video element and is configured to include a first column member accommodating the optical member configured with only a symmetric curved surface in the light-guiding optical system and a second column member accommodating the optical member having an asymmetric curved surface in the light-guiding optical system, and
wherein the rotation unit rotates the first column member in the column.

8. The head-mounted display according to claim 7, wherein the stop is provided on a side of the first column member in a connection portion between the first and second column members and is rotated along with the first column member by the rotation unit.

9. The head-mounted display according to claim 7, wherein the light-guiding optical system includes a light-guiding device including a light-guiding member that guides the image light by reflecting the image light from an internal surface and a light transmission member that is bonded to the light-guiding member so that outside light and the image light are viewed to overlap, and
wherein the second column member positions the light-guiding device.

10. The head-mounted display according to claim 7, wherein the rotation unit includes a stopper mechanism related to the rotation in a connection portion between the first and second column members.

11. The head-mounted display according to claim 1, wherein a rotation range of the rotation unit is 90°.

12. The head-mounted display according to claim 1, wherein the rotation unit includes an actuator performing a rotation operation.

* * * * *